Jan. 7, 1941.  A. RONNING  2,227,762
VEHICLE SUSPENSION MEANS
Filed May 21, 1938  3 Sheets-Sheet 1
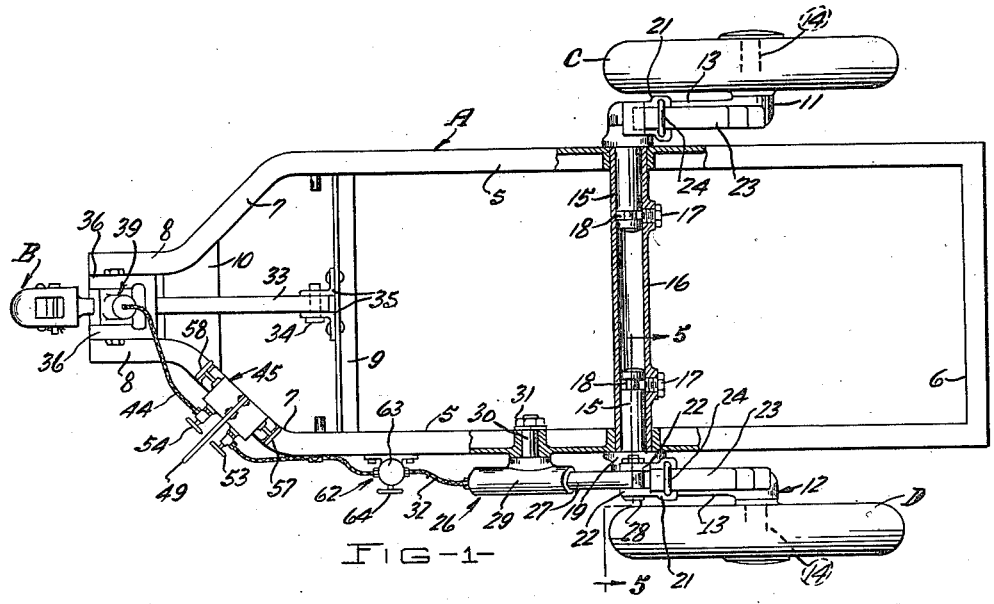
Fig-1-
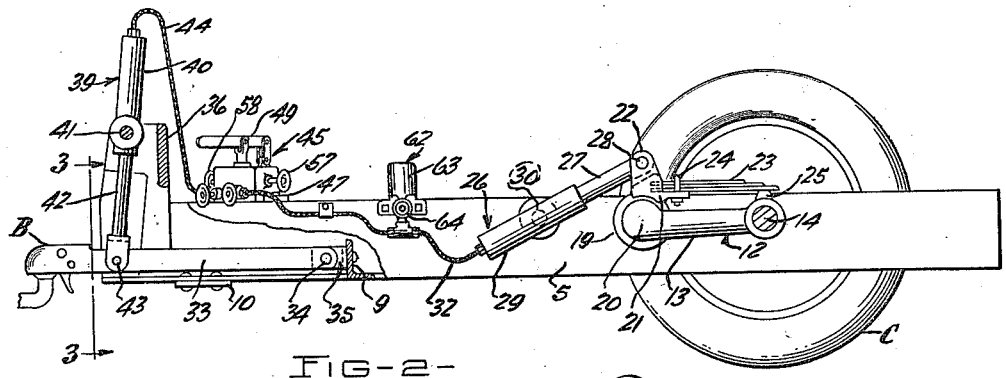
Fig-2-
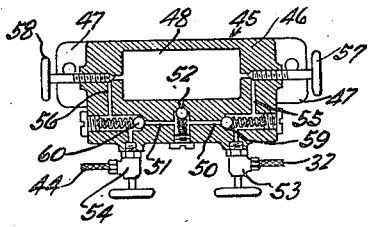
Fig-4-
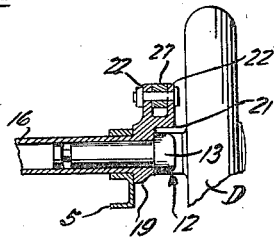
Fig-5-
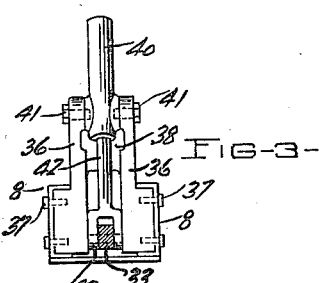
Fig-3-
INVENTOR
ADOLPH RONNING
BY Andrew C. Carlsen
ATTORNEY

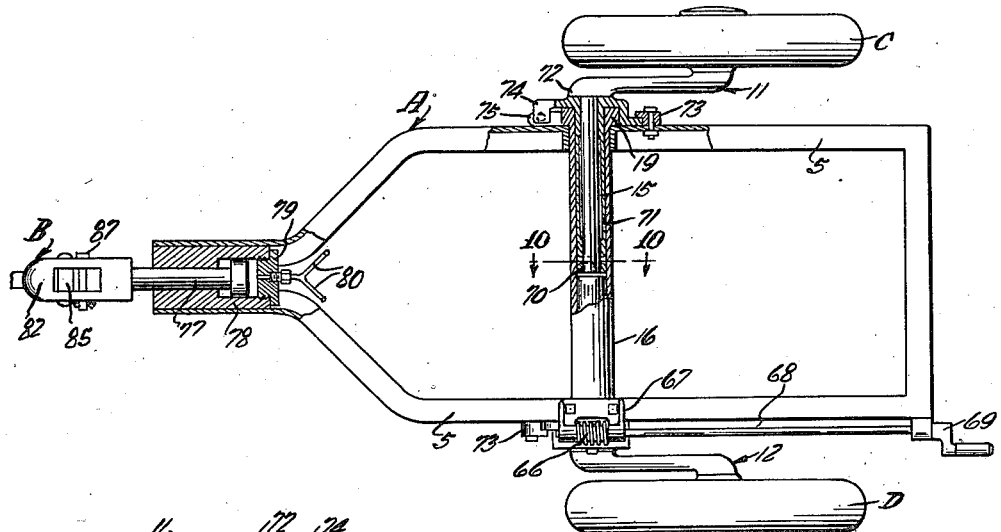
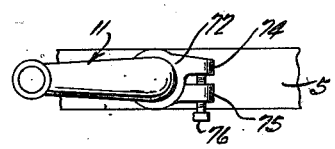
FIG-6-
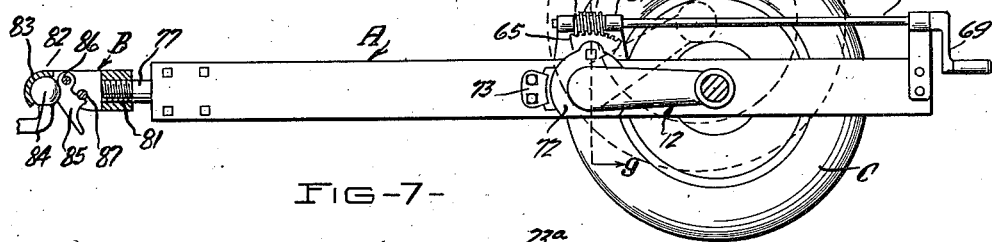
FIG-7-
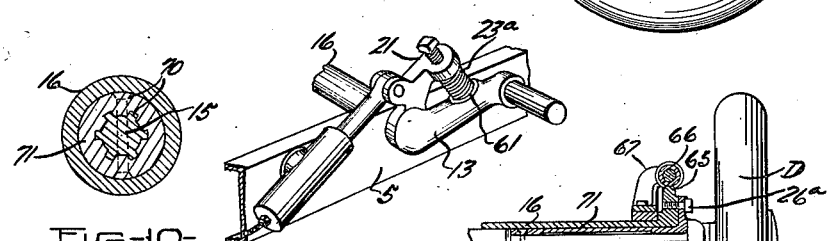
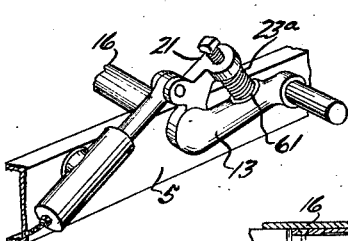
FIG-10-
FIG-11-
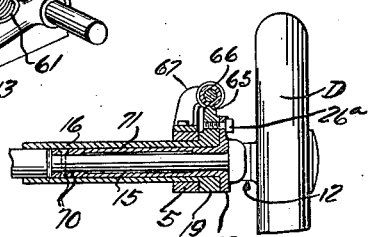
FIG-9-
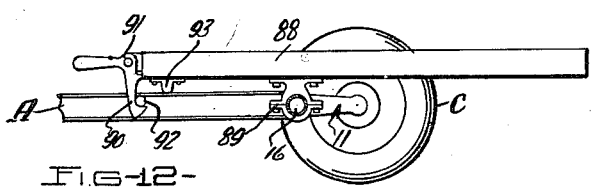
FIG-12-
INVENTOR
ADOLPH RONNING
BY
ATTORNEY

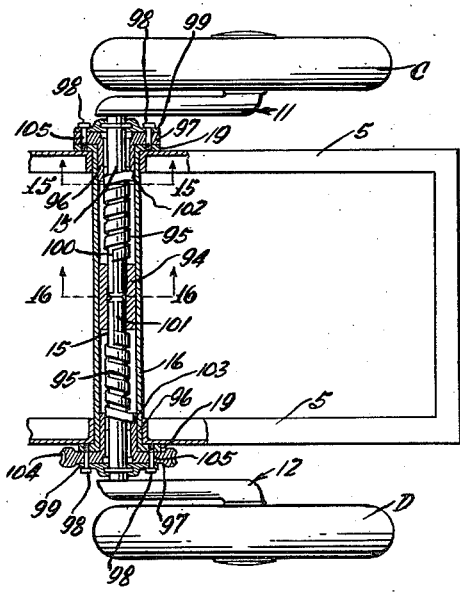

Patented Jan. 7, 1941

2,227,762

UNITED STATES PATENT OFFICE 2,227,762

VEHICLE SUSPENSION MEANS

Adolph Ronning, Minneapolis, Minn.

Application May 21, 1938, Serial No. 209,282

10 Claims. (Cl. 267—58)

This invention relates generally to suspension means for automobiles, tractors, and trucks, and more specifically to improvements in frame and suspension means especially suitable for trailers for such vehicles, but also adaptable for the rear wheel suspension of front wheel drive vehicles, as well.

The generic term "trailer" as herein used refers to that class of vehicle which is drawn by a motor car, whether it be a heavy truck or tractor, or an automobile of the pleasure type. Trailers of this kind are generally and popularly employed for the transport of goods and materials of all kinds, and also for pleasure use, in which case they are sometimes in reality compact travelling houses and bear the general name of house trailers. A trailer of either type embodies a frame or chassis which is hitched at its frontal end by a draft hitch to the motor car, and is supported rearwardly of the hitch by a pair of transversely aligned wheels, so that the frame balances and is supported on the wheels for transport over the roads. The body or tonneau, whether it be a van-like structure for transporting goods, or a house-shaped structure for pleasure use, is then supported on the frame and properly arranged and balanced to trail nicely behind the motor car or draft vehicle.

In order to afford road clearance beneath the trailer the frame or chassis must be supported at a considerable distance above the road, and this is ordinarily a fixed clearance which is maintained even while the trailer is at rest, although clearance may not be needed or even desirable at such times. As a result the loading of heavy goods and materials into the trailer is greatly hindered and, in the case of house trailers which are often parked for days on end the trailer has a tendency to sway in the wind, and the tires are needlessly subjected to the weight of the trailer when not in motion.

Having in mind the foregoing facts, it is the primary object of my invention to provide a frame and wheel suspension assembly for such trailers, and which may be readily adjusted to support the trailer at proper clearance height above the road or to lower the trailer and allow it to rest flat upon the ground while loading or while at rest.

Another object is to provide an improved frame and suspension or supporting mechanism for trailers by which the trailer may be raised and lowered at either end, or at each end together, and which, therefore, will provide for all contingencies which might arise in the use of the trailer. The raising and lowering of the frontal end of the trailer has the further advantage that it facilitates the hitching of the trailer to the draft vehicle and obviates the necessity of the use of jacks for this purpose.

Another object is to provide a trailer frame and supporting assembly of this kind in which the actual operation of raising and lowering the trailer may be carried out hydraulically or by mechanically operating means as may be found desirable.

Another object is to provide an assembly of this character in which the frame, even though vertically adjustable, is spring supported upon the wheels to prevent road shocks from disturbing the contents or occupants of the trailer.

Another object is to provide a trailer frame and adjustable supporting means therefor in which all operating parts are located within the confines of the frame and adequate road clearance is provided, even with a relatively low slung frame, thus carrying the load with its center of gravity as low as possible, as well as reducing the necessary range of movement of the frame in its raising and lowering action.

Another object is to provide an assembly of this kind in which all operating parts are compactly arranged in a dust proof manner, and in an arrangement which may be readily lubricated so that very little wear will occur and the dependability will be greatly enhanced.

A further object is to provide a trailer assembly having the foregoing advantageous characteristics, and which also embodies an improved type of draft hitch and an extremely efficient and practical form of surge brake which operates to exert a braking force on the trailer when the brakes are applied to the pulling vehicle.

The foregoing and other important objects and advantages of my invention will be made apparent in the course of the following detailed specification, in which reference is had to the accompanying drawings as forming a part thereof.

In the drawings—

Fig. 1 is a plan view of a trailer frame embodying my improved supporting and adjusting assembly and in which mechanism for hydraulic operation of the parts is shown.

Fig. 2 is a side elevation of the aforesaid structure, with the rear trailer wheel removed and a frontal portion of the frame broken away to disclose internal construction.

Fig. 3 is a transverse section along the line 3—3 in Fig. 2.

Fig. 4 is an enlarged longitudinal section through the hydraulic pump.

Fig. 5 is a fragmental transverse section along the line 5—5 in Fig. 1.

Fig. 6 is a plan view of a trailer frame showing a modified form of mechanically adjustable supporting means therefor, and an improved surge brake and draft hitch.

Fig. 7 is a side elevation of the assembly shown in Fig. 6, and showing one position of the parts in dotted lines.

Fig. 8 is a side elevation of the right hand wheel supporting arm and associated parts.

Fig. 9 is a transverse section along the line 9—9 in Fig. 7.

Fig. 10 is an enlarged diametrical section along the line 10—10 in Fig. 6.

Fig. 11 is a fragmental perspective view of one wheel supporting arm and adjacent parts showing coil spring suspension of the frame.

Fig. 12 is a longitudinal section, on a reduced scale, of a modified form of trailer frame and support.

Fig. 13 is a plan view of the rear portion of a trailer frame showing a modified form of spring support, and showing parts in section to disclose interior construction.

Fig. 14 is a side elevation of the assembly shown in Fig. 13, the near wheel being removed from its axle.

Figs. 15 and 16 are enlarged diametrical cross sections along the lines 15—15 and 16—16 in Fig. 13.

Fig. 17 is a fragmentary plan view, partially in section, showing still another modification of the frame and supporting means.

Fig. 18 is a side elevation of the structure shown in Fig. 17, the near wheel being removed from its axle.

Fig. 19 is a plan view, on a reduced scale, showing an assembly similar to Fig. 1 but of modified spring and cross rod construction.

Fig. 20 is a side elevation of Fig. 19, the near wheel again being removed.

Fig. 21 is a side elevation of still another type of spring assembly for the frame and wheels of the trailer.

Referring now more particularly, and by reference characters, to the drawings, A designates the trailer frame which is adapted to support the trailer body (not shown) of whatever kind used and which is provided at its frontal end with a draft hitch B by which it is attached to the pulling vehicle (also not shown) to travel therebehind upon the supporting wheels C and D. The foregoing parts are common throughout the drawings, and are indicated throughout by the same reference characters.

In the embodiment of my invention shown in Figs. 1 through 5, the frame A is of substantially rectangular shape having the parallel side bars 5, the rear cross member 6, and the forwardly converging frontal end portions 7 which terminate in the relatively closely spaced ends 8. A cross member 9 spans the side bars 5 rearwardly of the converging portions 7, and a tie plate 10 is secured between the rear portions of the ends 8. It will be noted that none of the foregoing parts fall below the lower line of the frame, nor do any of the operating parts yet to be described, and thus a maximum of road clearance is provided under the frame so that it may be located and normally supported relatively near to the ground without interference.

The wheels C and D are supported upon crank axles designated generally at 11 and 12 which include the crank arms 13, the outwardly and laterally turned wheel mounting portions or shafts 14 on which the wheels are journaled, and the inwardly turned trunnion portions or axles 15. A torque tube or tubular connecting member 16 is journaled crosswise through the side bars 5 of the frame, and the open ends of this tube pivotally receive the trunnions 15 of the crank axles, which are retained against outward axial displacement from the tube by retention screws 17 threaded radially through the walls of the tube and engaging annular grooves 18 formed near the inner ends of the trunnion.

The outer ends of the torque tube 16 are diametrically enlarged in the form of heads 19 which bear against the outer sides of the side bars 5 and prevent axial displacement of the tube in the frame. The junction of the crank arms 13 with the trunnions 15 are also enlarged, as indicated at 20, to bear against the heads 19 as shown. The heads 19 carry the radially projected spring mounting lugs or shoulders 21 which are laterally offset to extend outwardly over the crank arms 13, as shown, and one of these spring mounting lugs (here shown as the one on the left hand side) is provided with radially extended spaced ears 22. Leaf springs 23 are secured by clamps 24 to the lugs 21 and extend rearwardly therefrom to overlie the free ends of the crank arms 13 which have the bosses or bearing knobs 25 to upwardly engage the free ends of the springs.

The foregoing arrangement is such that, by locking the torque tube 16 in the position shown, the springs 23 will resiliently and yieldably support the crank arms 13 against upward movement at their outer, or rear, ends such as would allow the frame A to drop toward the ground. As a result, the frame is supported by the wheels C and at the proper road clearance height, but by allowing the torque tube to turn on its axis, the springs 23 may swing upwardly, allowing the crank arms 13 to move in the same direction so that the frame will settle to the ground.

The torque tube 16 is rotated and locked in any desired position by means of a hydraulic jack or press 26 which includes a plunger 27 pivotally connected at 28 between the ears 22 of the spring mounting lug 21 and slidably mounted in a cylinder 29 which is positioned on the frame side bar 5 forwardly of the torque tube 16. The cylinder 29 carries an inwardly extended stud 30 at a medial point which is pivotally mounted through the side bar 5 and retained by a nut 31 so that the cylinder may rock in a vertical plane as is necessary in the function of the assembly. Hydraulic fluid is led, under pressure, to the frontal end of the cylinder 29 through the flexible line 32, and this pressure is sufficient to lock the plunger 27 against forward axial movement so that it will retain the torque tube 16 in such position that the springs 23 will be rearwardly extended and the crank arms 13 will support the frame A above the road. However, as the pressure in the cylinder 29 is relieved and controlled by means to be presently described, the plunger 27 may move forwardly in the cylinder, allowing the torque tube 16 to rotate on its axis and permitting the crank arms 13 to swing upwardly at their rear ends so that the rear end of the frame A will descend and finally rest on the ground. By then readmitting the pressure to the cylinder the arms 13 may again be swung downwardly to elevate the frame.

The hitch B is formed and arranged at the frontal end of a draft bar 33 which extends rearwardly and medially between the frontal ends 8 of the side bars 5, and at its rear extremity is pivotally connected at 34 between brackets 35 affixed to the cross bar 9. The actual draft connection to the frame A is thus seen to be at the point 34. A jack supporting bracket having legs 36 is secured at 37 within the frame ends 8, and these legs extend upwardly therefrom in spaced relation, leaving space 38 for the free vertical play of the draft bar 33. A hydraulic jack 39 is provided and has its cylinder 40 pivotally mounted between the upper ends of the legs 36, by means of screws 41 which extend through the legs into the sides of the cylinder, and has its plunger 42 extended downwardly and pivotally connected at 43 to the draft bar 33 adjacent the frontal end thereof. A flexible line 44 carries hydraulic fluid under pressure to the upper end of the cylinder 40, and the pressure tends to urge the plunger 42 downwardly to hold the draft bar 33 down against the plate 10, in which position the frontal end of the frame A is held in an elevated position. However, by relieving this pressure, the plunger 42 may move upwardly in the cylinder 40 so that the draft bar 33 swings upwardly at its frontal end to allow the frontal end of the frame A to descend to the ground. Then the frame may again be raised by admitting pressure to the jack, as will be understood.

The foregoing assembly is such that, by proper control of the pressure in the jacks 26 and 39, the frame A may be raised and lowered at either its frontal or rear ends, or at both ends together, as will be readily understood. For thus actuating and controlling the jacks, I provide the pump assembly designated generally at 45, and comprising the housing 46 which may be secured at any desired point to, or in, the trailer by means of the mounting flanges 47. The housing 46 has a medially located pressure chamber 48 in which the pressure may be generated by manipulation of the pump lever 49 in a well known manner, and this pressure may be admitted to the lines 32 and 44 through the ducts or passages 50 and 51, which communicate with the chamber 48 through a check valve 52. The lines 32 and 44 communicate with these ducts through hand valves 53 and 54. By-pass or relief ducts 55 and 56 connect the outlet ends of the ducts 50 and 51 with the chamber 48 under control of hand actuated needle valves 57 and 58, and check valves 59 and 60 protect these by-pass ducts against discharge into the chamber except under control of the said needle valves.

The foregoing assembly permits great flexibility of control of the jacks, as will now be described. Assuming first that both valves 53 and 54 are open, and valves 57 and 58 are closed, and the system is properly charged with the hydraulic fluid, the actuation of the pump lever 49 will produce a pressure in the lines 32 and 44 sufficient to retain the frame in its elevated position, and this pressure will be retained through action of the check valves and the valves 57 and 58. Now, by opening either or both of these valves 57 or 58, the pressure in the jacks 26 or 39, or both, may be relieved so that the frame A settles to the ground. The valves thus permit either end of the frame to be lowered at will, or the frame may be maintained in a level position and allowed to descend evenly to the ground. To again raise the frame the valves 57 or 58 are closed, and the pump lever 49 again manipulated to restore the pressure. The valves 53 and 54 allow either jack to be cut off entirely, as may be desired in actuating the other jack.

In lieu of the leaf springs 23 for the resilient suspension of the frame, the coil springs may be employed as shown in Fig. 11 wherein the crank arm 13 is mounted in the torque tube 16, and the spring lug 21 is braced against one end of the expansion coil spring 23a which fits at its other end into a socket 61 in the arm. The same yieldable support is thus provided, and the remaining parts and their functions may be exactly as previously described.

In the case of the hydraulically operated assembly as described, the use of springs may be dispensed with entirely by the employment of an "air dome" 62 in the line 32 running to the jack 26. This device takes the form of an air tight housing 63 into which the hydraulic fluid from the line 32 is admitted (under control of the valve 64) against a head of air which is pocketed in the housing. This air pocket or head thus allows the fluid to rise and fall in the housing as road shocks occur on the assembly and permits limited yielding movement of the frame, as will be understood. The device may be mounted in any convenient position on the frame A, so that the valve 64 may be reached for adjusting the action.

Figs. 6 through 10 disclose a modified assembly wherein the frame is raised and lowered by mechanical means, and wherein the spring suspension assembly is entirely arranged within the torque tube. The frame A is of similar construction to that previously described, and the wheels C and D are supported by crank axles 11 and 12 which have their trunnion ends 15 extended loosely into the torque tube 16. This tube is journaled transversely through the frame side bars 5, and has heads 19 at its ends which bear against the outer faces of the bars. The tube has a gear toothed segment 65 at one end with which is meshed a worm pinion 66 journaled in the bracket 67 affixed to the frame. An operating shaft 68 extends rearwardly from the worm and terminates in a crank 69 by which the worm may be turned to rotate the torque tube 16, as will be understood.

The inner ends of the trunnions 15 are both pinned and splined at 70 to the inner ends of torsion tubes 71 which have outer ends 72 overlapping the ends of the torque tube 16 and retained in place by grooved blocks 73 secured to the sides of the bars 5. The torque tube has an extended lug 74 at one end, and the outer end of one of the torsion tubes 71 has a similar lug 75 against which a screw 76, threaded through the lug 74, is caused to bear. The other torsion tube is rigidly secured to the torque tube by a screw 76a. The actual connection between the torque tube 16 and the crank axles 11 and 12 is thus formed at opposite ends of the torsion tubes 71 so that the yieldable twisting or torsional spring action of these tubes serves to resiliently support the wheels. The screw 76 permits adjustment of the relative angular positions of the wheel axles 11 and 12 to level the trailer laterally. For the greater part of their length the torsion tubes 71 are relatively thin walled, as indicated in Figs. 6 and 9, in order to facilitate their spring action and effect.

In operation, the frame A may be raised and lowered at its rear end by manipulation of the crank 69 to rotate the torque tube 16 in the manner previously described, and the frame will be resiliently supported by action of the torsion tubes 71.

The hitch B, in this assembly, is mounted at the frontal end of a plunger 77 which plays in a cylinder 78 secured between the frontal ends 8 of the frame A. The cylinder 78 is plugged at its rear end by the plug 79, and flexible lines 80 lead off from this plug to brakes (not shown) on the wheels C and D. The arrangement is such that the forward surge of the trailer, under momentum and as the pulling vehicle stops or reduces speed, causes the plunger 77 to move rearwardly in the cylinder 78 and set up a pressure therein which may be transmitted to the brakes of the trailer through the lines 80 to thus exert a braking effect on the trailer. This assembly constitutes a very simple and effective "surge brake," as will be readily apparent.

In order to permit the assembly of the brake plunger 77 in the cylinder 78 the hitch B is threaded on the frontal end of the plunger, as shown at 81, so that it may be removed when necessary. The hitch is further of advantageous construction in that it comprises the head 82 having a socketed frontal end 83 to fit over the ball-shaped member 84 of the hitch (which is secured to the pulling vehicle), and has the movable clamp arm 85 which pivots at 86 to swing towards or away from the member 84. When in engagement with this member, the arm 85 locks the trailer to the hitch while still permitting pivotal or universal movement at the hitch, and when the arm is swung away from the member it, of course, allows the hitch to be readily disconnected. A transversely extended pin 87 normally retains the arm 85 in engaged position, as shown.

In Fig. 12 the trailer frame A is supported by crank axles, one of which is shown at 11 connected to the wheel C, so that it may be raised and lowered in the manner hereinbefore set forth. An auxiliary frame or loading platform 88 is also provided, and is medially supported by bearings 89 upon the transversely extended torque tube 16, so that the loading platform may rock on the tube. Normally, the platform 88 is held in horizontal position by a latch 90, pivotally mounted at 91 at the frontal end, and arranged to normally engage a pin or stop 92 secured on the frame A so as to hold down this frontal end, as shown. A stop 93 is secured beneath the frontal end of the loading platform, and engages the frame A to limit the movement and stop the platform in a horizontal position. The frame A may thus be lowered to the ground, and the platform 88 released by the latch 90 to tilt downwardly at its rear end and facilitate the loading of heavy articles into the trailer. The platform may also, of course, be released, and tipped downwardly for loading without lowering the trailer frame, where this may be desirable.

Still another modification of the spring suspension assembly is shown in Figs. 13 through 16, wherein the frame is again indicated at A, the wheels at C and D, their supporting crank axles at 11 and 12, and the torque tube at 16. The torque tube 16 is journaled through the side bars 5 of the frame A, and has the heads or flanges 19 at its ends, which bear against the bars. The trunnion ends 15 of the crank axles extend loosely into the torque tube and at their inner ends are journaled in a bushing 94 mounted medially in the tube. Flat wound, torsional coil springs 95 are secured at their inner ends to the trunnions 15, are coiled therearound as shown, and at their outer ends are secured to collars 96 which fit loosely over the trunnions. These collars 96 extend inwardly some distance into the ends of the torque tube 16, and at their outer ends have flanges 97 which are secured by screws 98 to the ends 19 of the tube to turn therewith. Dust proofed, split covers 99 are secured over these flanges 97 by the same screws 98. The springs 95 are anchored at their inner ends to the trunnions 15 by turning their extremities 100 into grooves 101 cut in the trunnions and in similar manner the outwardly turned extremities 102 are extended into grooves 103 in the collars 96 to anchor the outer ends of the springs. In this manner the springs are so mounted that they will resiliently resist movement of the trunnions 15 such as caused by road shocks and the like, as will be readily apparent.

One flange 97 is diametrically enlarged and toothed to form a worm gear 104 with which is engaged a worm pinion 66 journaled in a bracket 67 and provided with a crank 69 for oscillating the torque tube and raising and lowering the frame. This mechanism, of course, operates in the same manner as that previously disclosed in Figs. 6 and 7.

The openings 105 in the flanges 97 through which the screws 98 are extended may be arcuately elongated (as shown in Fig. 14) so that the flanges and the collars 96 may be adjusted or rotated slightly to increase or decrease the tension of either spring 95, or to level the frame A laterally.

In Figs. 17 and 18 the torque tube 16a is rigidly mounted across the frame A and serves only as a housing for the trunnions 15 of the crank axles 11 and 12 which are journaled into the tube to support the wheels C and D. Split, dust excluding covers 99 fit around the trunnions 15 and are secured to the outer sides of the frame bars 5. In this case a hydraulic jack 26 is provided at each side, and the plungers 27 are pivotally connected to ears 22 formed on the crank axles to raise and lower these axles as hydraulic pressure enters or leaves the cylinders 29. This assembly has no spring suspension though of course any of the various spring assemblies hereinbefore described may be used as desired.

In Figs. 19 through 21, the torque tube is entirely dispensed with, and in lieu thereof a solid rock shaft 105 is journaled through the side bars 5 of the frame A, and is arranged to be oscillated or rocked on its axis by a hydraulic jack 26 arranged within the frame and connected to a crank 106 secured to the shaft. Other means may, of course, be used for operating the shaft. At its outer ends the shaft 105 carries spring mounting blocks 107 which are splined on the shaft and further secured by clamp bolts 108 extended through the split sides 109 to clamp the blocks on the shaft. A further lock is provided by extending the bolts 108 through tangential grooves 110 cut in the shaft.

The wheels C and D are supported upon axles 111 secured in axle blocks 112, and these blocks are supported by means of leaf springs 113 which are clamped or secured at their ends to opposite sides of the blocks 107 and 112, as shown. The entire assembly thus provides crank axles for supporting the wheels, and allowing the frame A to be raised and lowered, and the springs 113 serve to resiliently support the wheels to prevent bumping. In lieu of the separate straight leaf springs 113, U-shaped springs 113a may be employed as shown in Fig. 21.

It will be noted that the various assemblies shown in Figs. 6, 12, 13, 17, and 19, provide only for lowering the rear of the trailer frame, and this is, of course, sufficient in many instances. However, means may be provided for lowering the frontal end of the frame, similar to that shown in Figs. 1 and 2, where such action is desired. Also where the trailer has more than two wheels they may all be provided with raising and lowering means.

It is understood that I may vary from the structures herein described and shown, providing that such variations lie within the scope of the appended claims.

Having thus fully disclosed my invention, what I claim as new and desire to protect by Letters Patent is:

1. In a vehicle, a frame, wheels for supporting the frame, crank axles connected to the wheels, a tubular member adjustably mounted in the frame and rotatably supporting the crank axles for vertical movement thereof and to raise and lower the frame, and spring means in said tubular member yieldably connecting the said crank axles and the tubular supporting member.

2. In a vehicle, a frame, wheels for supporting the frame, crank axles rotatably supporting the wheels and having trunnions extended in spaced parallel relation to the axes of the wheel, a tubular member rotatably mounted in the frame and receiving the said trunnions, coil spring means forming yieldable connections between the crank axles and the tubular member, and means for rocking the tubular member on its axis.

3. In a vehicle, a frame, wheels for supporting the frame, a tubular member journaled in the frame, crank axles radially extended from the tubular member and supporting the said wheels at their outer ends, means for adjusting the tubular member on its axis in the frame for raising and lowering the frame, and separate coil springs arranged in said tubular member and connected to the crank axles for yieldably resisting upward movements of the wheel supporting ends of said axles.

4. In a vehicle, a frame, wheels for supporting the frame, a tubular member journaled in the frame, crank axles radially extended from the tubular member and supporting the said wheels at their outer ends, means for adjusting the tubular member on its axis in the frame for raising and lowering the frame, and spring acting means within the tubular member yieldably resisting upward movement of the crank axles.

5. In a vehicle, a frame, wheels for supporting the frame, a tubular member journaled in the frame, crank axles radially extended from the tubular member and supporting the said wheels at their outer ends, means for adjusting the tubular member on its axis in the frame for raising and lowering the frame, torsional spring acting means located within the tubular member and yieldably connecting the said member and the crank axles, and means for independently adjusting the tension of the said spring acting means for each axle.

6. In a vehicle, a frame, wheels for supporting the frame, a tubular member mounted transversely in the frame, crank axles connected to the wheels and having trunnion members journaled in the opposite ends of said tubular member, collar members mounted in said tubular members, and torsional coil springs coiled around said trunnion members and secured at opposite ends to the trunnion members and collar members to yieldably resist upward movement of the wheels relative to the frame.

7. In a vehicle, a frame, transversely spaced wheels for supporting the vehicle, a tubular member mounted transversely in the frame, crank axles connected at one end to the wheels and having trunnions at their other opposite ends journaled in the ends of the said tubular member, collars mounted over the ends of the tubular member around the trunnions, torsional springs coiled around the trunnions within the tubular member and connected at their opposite ends to the trunnions and collars in a manner to yieldably resist upward movement of the wheels relative to the frame, and the said collars being adjustable relative to the trunnions to permit the tension of the springs to be individually adjusted.

8. In a vehicle, a frame, transversely spaced wheels for supporting the vehicle, a tubular member mounted transversely in the frame, crank axles connected at one end to the wheels and having trunnions at their outer ends journaled in the ends of the said tubular member, collars mounted over the ends of the tubular member around the trunnions, torsional springs coiled around the trunnions within the tubular member and connected at their opposite ends to the trunnions and collars in a manner to yieldably resist upward movement of the wheels relative to the frame, the said collars being secured to the tubular member, and means connected to at least one collar for adjusting the tubular member about its axis and thereby raising or lowering the wheels relative to the frame.

9. In a vehicle, a frame, transversely spaced wheels for supporting the vehicle, a tubular member mounted transversely in the frame, crank axles connected at one end to the wheels and having trunnions at their other ends journaled in the ends of the said tubular member, collars mounted over the ends of the tubular member around the trunnions, torsional springs coiled around the trunnions within the tubular member and connected at their opposite ends to the trunnions and collars in a manner to yieldably resist upward movement of the wheels relative to the frame, the said collars being secured to the tubular member, one of said collars having a diametrically enlarged and toothed flange forming a gear, and operating gear means meshed therewith for adjusting the tubular member about its axis.

10. In a vehicle, a frame, wheels for supporting the frame, a tube journaled transversely in the frame, crank axles connected at one end to the wheels and having trunnions at their other ends loosely mounted in the tube, bushing means engaging inner ends of the trunnions, collars secured to the ends of the tube and forming bearings at the outer ends of the trunnions, torsional springs coiled around the trunnions between the bushing means and bearing and secured at opposite ends to said trunnions and collars to yieldably resist rotation of the parts in one direction, and dust proof covers mounted over the collars and trunnions to protect parts within the tube from dust.

ADOLPH RONNING.